United States Patent

[11] 3,545,571

| [72] | Inventor | John W. Kirkpatrick<br>Indianapolis, Indiana |
|---|---|---|
| [21] | Appl. No. | 785,211 |
| [22] | Filed | Dec. 19, 1968 |
| [45] | Patented | Dec. 8, 1970 |
| [73] | Assignee | General Motors Corporation<br>Detroit, Michigan<br>a corporation of Delaware |

[54] PRESSURE TRANSFER DEVICE
6 Claims, 2 Drawing Figs.

[52] U.S. Cl. ................................................. 184/6;
73/420; 308/187
[51] Int. Cl. ................................................. F01m 9/00
[50] Field of Search .......................................... 73/420,
116; 277/25, 74, 28, 29; 285/11; 184/6(TS), 6;
308/187

[56] References Cited
UNITED STATES PATENTS
| 2,981,058 | 4/1961 | Reed | 73/116UX |
|---|---|---|---|
| 3,034,797 | 5/1962 | Pike | 277/74X |
| 3,085,838 | 4/1963 | Patterson | 184/6(TS)UX |
| 3,424,374 | 1/1969 | Robey | 184/6X |
| 3,474,734 | 10/1969 | Stogner | 308/187 |

*Primary Examiner*—Louis R. Prince
*Assistant Examiner*—Daniel M. Yasich
*Attorneys*—Paul Fitzpatrick and E. W. Christen

ABSTRACT: A device for transmitting pressures from within a rotating machine includes nonrotating oil supply and pressure readout tubes which are connected to the rotating body by spherical and slip bearings, one of which is relatively rotatable. The bearings are sealed and lubricated by oil. The oil on the inner side of the bearing with respect to the rotating structure is vented through a centrifugal trap to preserve a pressure seal on the readout device. The tubes are additionally supported in a second support including a spherical bearing.

PATENTED DEC 8 1970

3,545,571

INVENTOR.
John W. Kirkpatrick
BY
Paul Fitzpatrick
ATTORNEY

PRESSURE TRANSFER DEVICE

This invention is directed to apparatus for reading out pressure from rotating machines. It is particularly adapted for pressure transfer from rapidly rotating gas-dynamic machines such as compressors and turbines. The arrangement provides a lubricant-sealed readout device with an inlet which may be readily connected to the rotor of a gas-dynamic machine to connect up with any sort of pressure probe mounted within the rotor, and with an outlet which may be connected to a pressure gauge or other responsive device.

The principal objects of my invention are to provide a pressure transfer or readout device which is suited for attachment to high speed rotating machinery and which will provide a sealed connection for an instrumentation tube by which pressure is transmitted to an indicating or responsive device external to the rotating machine. Other objects are to provide such a device which is simple and reliable and which is easily installed, and to provide such a device which is satisfactory for use in relatively hot environments. A further object is to provide a connection to rotating machinery which does not require precise alinement The nature of the invention and its advantages will be clear to those skilled in the art from the succeeding detailed description of the preferred embodiment of the invention and the accompanying drawings thereof.

Figure 1:
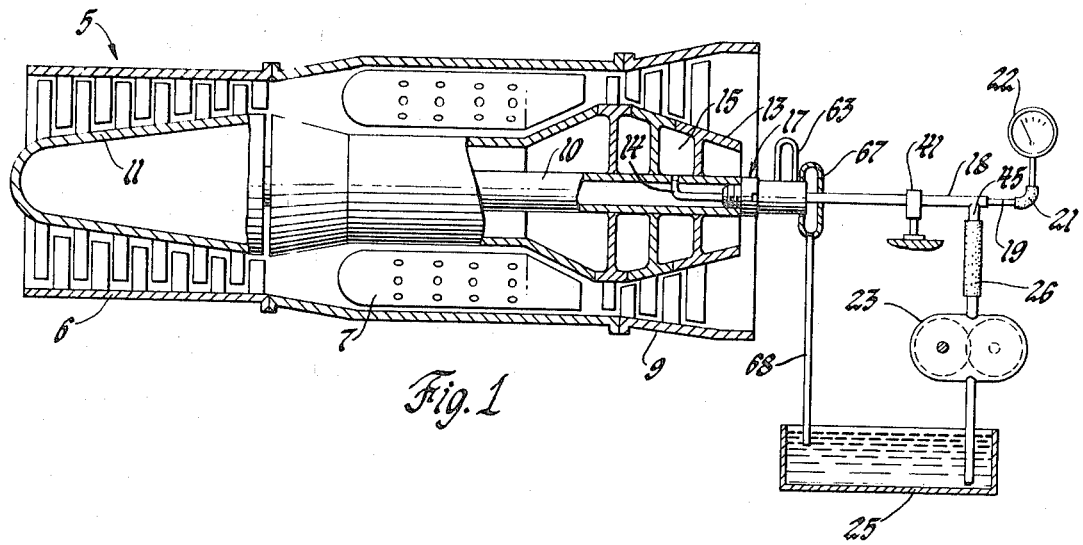
FIG. 1 is a schematic diagram of a pressure transfer device connected to the turbine rotor of a gas turbine engine.

FIG. 1 shows a gas turbine engine 5 including the usual compressor 6, combustion apparatus 7, and turbine 9, the turbine being connected to the compressor by shafting 10. The compressor includes a rotor 11 and the turbine includes a rotor 13. As an illustration of the use of the invention, a pressure tube 14 is provided to connect the space 15 between the second and third turbine wheels to a fitting 17 fixed on the end of the turbine shaft 10. The fitting 17 rotates with the turbine and connects the rotor to an oil supply tube 18 and a pressure readout tube 19 which extends through the oil supply tube 18. The pressure readout tube may be connected by suitable means such as a flexible hose 21 to a pressure gauge 22 or other device to indicate or respond to the pressure picked up within the turbine rotor. A lubricating oil pump 23, driven by means not illustrated, draws lubricating oil from a sump 25 and supplies it through a flexible conduit 26 to the oil supply tube 18. The oil could be taken from and returned to the engine oil pump, if desired.

Figure 2:
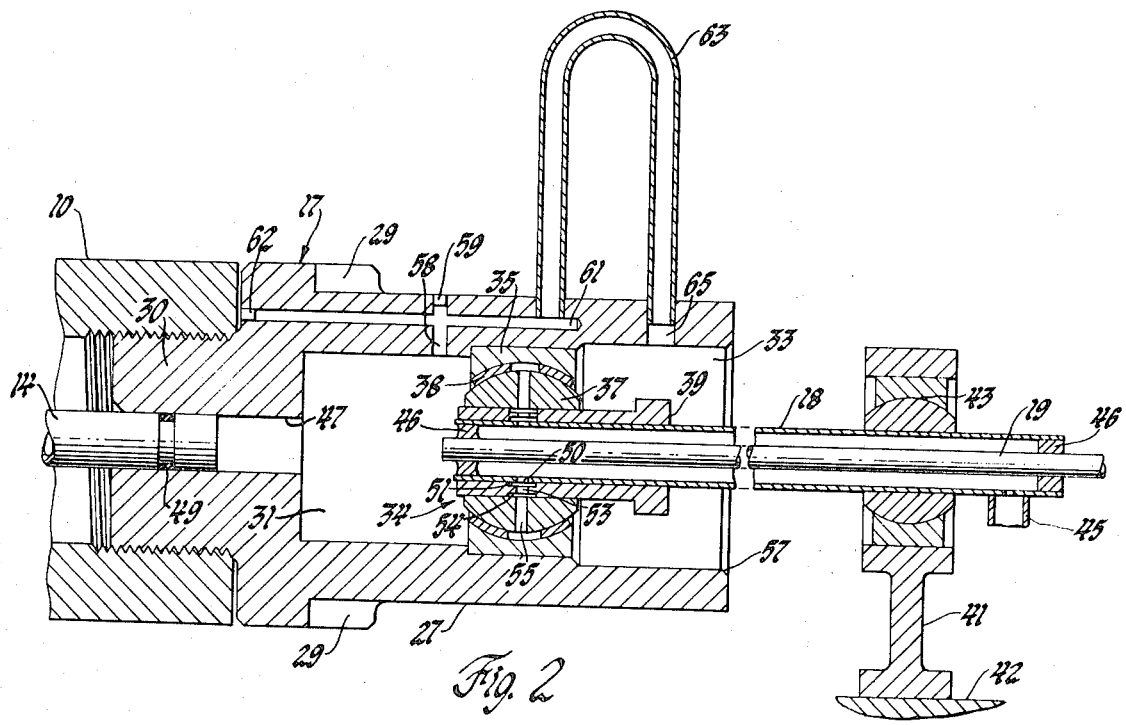
FIG. 2 is an enlarged sectional view of the principal structural parts of the transfer device.

Referring now particularly to FIG. 2, the fitting 17 is a roughly cylindrical body having an outer wall 27 including notches 29 for a spanner wrench. The fitting 17 also includes a spigot 30 which is threaded so as to be assembled to the end of the shaft 10, which is internally threaded. The fitting 17 defines a stepped internal cavity, one part of which may be called an internal chamber 31 and another part of which may be termed an exterior chamber 33. Bearing means 34 including parts 35, 37, 38 and 39 divides the internal chamber from the exterior chamber. This bearing means includes an outer sleeve 35 pressed into the fitting 17 and bearing against a shoulder in the interior cavity. The interior of sleeve 35 is spherical, and the spherical inner bearing member 37 is mounted within it with suitable antifriction material 38 disposed between the two spherical surfaces. The inner bearing member 37 is pressed onto an inner bearing sleeve 39 within which the end of oil supply tube 18 is mounted for relative rotation. Thus, when shaft 10 rotates, the parts 35, 37, and 39 rotate with it and oil supply tube 18 remains stationary. The bearing means 34 thus provides one support for tube 18. Another support is provided by a fixed rest 41 mounted on a suitable support 42 and including a spherical bearing 43. The presence of the two spherical bearing arrangements makes the installation tolerant of reasonable misalignment between the axis of shaft 10 and the axis of the oil tube 18. Tube 18 is slidable within bearing 43 and bearing 43 permits angular shifting of tube 18 relative to its support. The bearing means 34 is of the sliding contact type and permits angular and axial shifting of the members 18 and 19 relative to the shaft 10.

As shown in FIG. 2, a stub tube 45 extends from the tube 18 for connection through hose 26 to the oil pump 23. The pressure readout tube is sealed and fixed in the oil tube 18 by annular plugs 46 at each end of tube 18, the structure being brazed or otherwise fixed together. Tube 19 thus extends coaxially through tube 18 and is open at one end into the internal chamber 31. Pressure tube 14 is mounted in a central bore 47 in fitting 17 which connects it to the internal chamber 31. An O-ring seal 49 or any other suitable sealing arrangement may be provided between the tube 14 and the fitting 17. Oil supplied by the pump 23 is discharged to lubricate the bearing means 34 through ports 50 in the wall of the tube 18 communicating with a recess 51 in the inner surface of inner sleeve 39. Recess 51 communicates through radial ports 53 with an annular groove 54 on the outer surface of inner sleeve 39. This in turn communicates through passages 55 in the inner bearing member 37 with the bearing surfaces 38 which cooperate with the inner bearing member 37. The oil thus supplied under pressure (which pressure may be controlled by a relief valve, not illustrated) will seep along the outer surface of shaft 18 within inner sleeve 39 and through the gap between pads 38 and inner bearing member 37.

The oil discharged to the right of bearing means 34, as illustrated in FIG. 2, is discharged into the exterior chamber 33 from which it can spill over the lip 57 of the fitting 17. The oil which escapes from the bearing means into the internal chamber 31 is vented through an oil vent line comprising a drilled passage 58 plugged at 59 and an intersecting axially extending drilled passage 61 closed at one end by a plug 62. Passage 61 communicates with a U-tube 63 fixed onto fitting 17 which serves as a centrifugal trap. One end of U-tube 63 is supplied through passage 61 and the other is vented through a bore 65 into the exterior chamber 33. Oil which is discharged from the bearing means 34 into chamber 31 is thrown centrifugally outward to the outer wall of the chamber and on through passages 58 and 61 into the trap 63. As the trap fills, the centrifugal force acting on the oil within the trap provides a force to balance the pressure being measured, which exists in chamber 31. As the oil accumulates, it spills over the end of the bore 65 and is discharged along with the oil which escapes from the outer end of the bearing means.

In most installations it is highly desirable to provide an annular shield 67 around the outer end of the fitting 17 into which the oil flung over lip 57 is discharged and from which it can flow through a drain line 68 into sump 25.

The operation of the device should be clear from the foregoing. The fitting 17 with the bearing means 34, including inner sleeve 39, is mounted on the rotor with the tube 14 connected into it. The oil tube 18 is then inserted into the bearing means with the rest 41 so located as to aline the tube 18 approximately with the axis of the rotor. The oil supply pump 23 is operated and, as the engine to be tested begins to rotate, the oil is fed into the bearing surfaces sealing them and flowing into the trap 63 to seal this against the pressure to be measured. The pressure to be measured is transmitted through the readout tube 19 and any other suitable connection means to the gage 22 or other instrument which is to respond to the pressure.

It should be noted that neither the radial nor the axial alinement of the tube 18 is critical, since it may be adjusted to some extent radially or axially of the bearing means without interfering with proper flow of oil. The device illustrated is particularly suited to use with high speed rotating machinery such as turbines and compressors. It provides a simple and readily installed means to connect the stationary external device to the rapidly rotating device from which a pressure readout is needed.

The detailed description of the preferred embodiment of the invention for the purpose of explaining the principles thereof is not to be considered as limiting or restricting the in-

I claim:

1. Apparatus for communicating a fluid pressure from within a rotating body to a stationary body external to the rotating body comprising, in combination, a part on the rotating body communicating with the interior of the rotating body and defining a cavity substantially coaxial with the axis of rotation of the body, adjustable bearing means mounted on the part closing off the cavity from an open exterior space, the bearing means being of sliding contact type angularly and axially shiftable and including outer and inner members relatively rotatable about said axis, a nonrotating hollow member defining an oil supply conduit and a pressure readout conduit supported by the bearing means, the oil supply conduit being connected to the said bearing means to supply lubricant thereto, and an oil vent line from the interior of the cavity to the exterior space including a centrifugal trap adapted to contain vented oil to seal the vent line against pressure leakage from the cavity, the pressure readout conduit being open into the interior of the cavity adjacent the said axis.

2. Apparatus as defined by claim 1 including also a second support for the said hollow member, the second support including provision for axial shifting of the hollow member relative to said second support.

3. Apparatus as defined in claim 2 in which the second support includes provision for angular shifting of the hollow member.

4. Apparatus as defined in claim 2 in which the bearing means includes a spherical bearing mounted in the said part and a cylindrical bearing mounted in the spherical bearing.

5. Apparatus as defined by claim 4 including also a second support for the said hollow member, the second support including provision for axial shifting of the hollow member relative to said second support.

6. Apparatus as defined by claim 5 in which the second support includes provision for angular shifting of the hollow member.

PO-1050
(5/69)

UNITED STATES PATENT OFFICE
CERTIFICATE OF CORRECTION

Patent No. 3,545,571　　　　　Dated December 8, 1970

Inventor(s) John W. Kirkpatrick

It is certified that error appears in the above-identified patent and that said Letters Patent are hereby corrected as shown below:

Column 2, line 62, "gage" should read -- gauge --.

Column 2, line 64, "alinement" should read -- alignment --.

Column 4, line 11, reference to "claim 2" should read -- claim 1 --.

Signed and sealed this 11th day of May 1971.

(SEAL)
Attest:

EDWARD M. FLETCHER, JR.　　　　　WILLIAM E. SCHUYLER
Attesting Officer　　　　　　　　　Commissioner of Pat